(12) United States Patent
Baldauf et al.

(10) Patent No.: US 8,683,983 B2
(45) Date of Patent: *Apr. 1, 2014

(54) METHOD FOR REGULATING A STATIONARY GAS ENGINE

(75) Inventors: Johannes Baldauf, Wangen (DE); Peer Smuda, Sindelfingen (DE); Ludwig Klaeser-Jenewein, Frickingen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 959 days.

This patent is subject to a terminal disclaimer.

(21) Appl. No.: 12/744,122

(22) PCT Filed: Nov. 17, 2008

(86) PCT No.: PCT/EP2008/009705
§ 371 (c)(1),
(2), (4) Date: Jun. 14, 2010

(87) PCT Pub. No.: WO2009/065541
PCT Pub. Date: May 28, 2009

(65) Prior Publication Data
US 2010/0242937 A1   Sep. 30, 2010

(30) Foreign Application Priority Data
Nov. 23, 2007   (DE) .......................... 10 2007 056 623

(51) Int. Cl.
*F02B 43/00*   (2006.01)

(52) U.S. Cl.
USPC .............................. 123/527; 701/103; 123/704

(58) Field of Classification Search
USPC ......... 123/704, 352, 359, 361, 399, 438, 436, 123/480, 494, 674, 679, 681, 683; 701/103, 701/104, 192, 106, 109, 110, 113
See application file for complete search history.

(56) References Cited

U.S. PATENT DOCUMENTS

| | | | | |
|---|---|---|---|---|
| 5,365,903 A | * | 11/1994 | Watanabe | 123/339.22 |
| 6,018,694 A | * | 1/2000 | Egami et al. | 701/102 |
| 6,055,476 A | * | 4/2000 | Yoshino | 701/110 |
| 6,090,007 A | * | 7/2000 | Nakajima et al. | 477/46 |
| 6,152,105 A | * | 11/2000 | Nishimura et al. | 123/339.11 |
| 6,167,342 A | * | 12/2000 | Itoyama et al. | 701/104 |
| 6,189,523 B1 | * | 2/2001 | Weisbrod et al. | 123/672 |
| 6,530,360 B1 | * | 3/2003 | Kondo | 123/406.27 |

(Continued)

FOREIGN PATENT DOCUMENTS

| DE | 102 51 252 A | 7/2003 |
|---|---|---|
| DE | 103 46 983 A | 5/2005 |

(Continued)

*Primary Examiner* — Stephen K Cronin
*Assistant Examiner* — Carl Staubach
(74) *Attorney, Agent, or Firm* — Lucas & Mercanti, LLP; Klaus P. Stoffel (57) ABSTRACT

The invention relates to a method for regulating a stationary gas motor (1). In said method, a deviation of the regulated speed is calculated from a desired speed and an actual speed, a desired moment is determined as an adjustable variable from the deviation of the regulated speed by means of a speed governor, said desired moment being limited to an air ratio-limiting moment by limiting the moment, and a desired volume flow (VSL) is determined from the limited desired moment in order to define an angle (DKW1, DKW2) of the mixture throttle valve and an angle of the gas throttle valve.

8 Claims, 4 Drawing Sheets

(56) References Cited

U.S. PATENT DOCUMENTS

| | | | |
|---|---|---|---|
| 7,082,924 B1 * | 8/2006 | Ruedin | 123/352 |
| 8,340,885 B2 * | 12/2012 | Baldauf et al. | 701/103 |
| 2005/0205057 A1 * | 9/2005 | Yamashita | 123/406.58 |
| 2009/0120699 A1 * | 5/2009 | Suzuki et al. | 180/65.265 |

FOREIGN PATENT DOCUMENTS

| | | |
|---|---|---|
| DE | 10 2007 045 195 | 3/2009 |
| EP | 0 974 745 A | 1/2000 |
| EP | 1 158 149 A | 11/2001 |

* cited by examiner

Fig. 5E

METHOD FOR REGULATING A STATIONARY GAS ENGINE

This application is a 371 of PCT/EP2008/009705 filed Nov. 17, 2008, which in turn claims the priority of DE 10 2007 056 623.0 filed Nov. 23, 2007, the priority of both applications is hereby claimed and both applications are incorporated by reference herein.

BACKGROUND OF THE INVENTION

The invention concerns a method for automatically controlling a stationary gas engine, in which a speed control deviation is computed from a set speed and an actual speed, the speed control deviation is used by a speed controller to determine a set torque as a correcting variable, and a torque limiter limits the set torque to an air ratio limit torque. In addition, the method consists in determining a set volume flow from the limited set torque in order to determine a mixture throttle angle and a gas throttle angle.

Stationary gas engines are used for electric power generation. In this connection, the gas engine is operated at a lambda value of, for example, 1.7, i.e., a lean mixture with excess air. The gas engine typically includes a gas throttle for setting the gas fraction in the gas/air mixture, a mixer for mixing the combustible gas and the air, a compressor as part of an exhaust gas turbocharger, a cooler, and a mixture throttle. The intake volume flow in the receiver tube upstream of the intake valves of the gas engine is set by the mixture throttle, and thus the mixture pressure in the receiver tube is also set.

EP 1 158 149 A1 describes a stationary gas engine for driving a generator. The gas engine is controlled by using a characteristic curve to compute a set lambda as a reference input from the engine output. On the basis of the set lambda, an electronic engine control unit computes a gas quantity set value for adjusting the gas throttle. In a second embodiment, the set lambda value is computed from a mixture pressure control deviation. The mixture pressure control deviation is determined from the detected actual mixture pressure in the receiver tube and the set mixture pressure, which in turn is determined from the engine output by means of a characteristic curve. In a third embodiment, as a supplement to the second embodiment, the gas quantity set value is corrected to adjust the gas throttle as a function of the position of a compressor bypass valve and the speed control deviation. A common feature of all three embodiments is the adjustment of the gas throttle to a set lambda value. In practical operation, this means that when a change in the power assignment is made, first a change is made in the position of the mixture throttle as the power control element. This has the effect that the intake mixture volume flow also changes. Since the position of the gas throttle initially remains constant, there is also no change in the gas volume flow. This results in a changing actual lambda. When a mixture throttle is controlled to move, for example, in the closing direction, this causes enrichment of the mixture, which results in a change in output of the gas engine. As a response to this change in output, the set lambda value, the gas quantity set value, and the position of the gas throttle are then changed. In this type of automatic control, the response time, for example, when the load changes, is critical, since intervention in the lambda control is sluggish due to the system itself.

DE 103 46 983 A1 also describes a gas engine and a method for automatically controlling the fuel mixture. In this method, in a first step, an actual pressure difference of the air mass flow is determined in a venturi mixer, and, in a second step, a set pressure difference of the air mass flow is determined from the measured actual output of the gas engine. In a third step, the actual pressure difference is then brought closer to the set pressure difference by changing the amount of gas supplied by changing the position of the gas throttle. In a fourth step, the actual gas engine output that develops is detected again, and the mixture throttle is adjusted in such a way that the set/actual deviation of the pressure difference of the air mass flow in the venturi mixer is reduced. This sequential order of operations is carried out iteratively until the set/actual deviation of the pressure difference is smaller than a limit. Since a change in the position of the mixture throttle produces a change in the output of the gas engine, the position of the gas throttle must be readjusted to compensate the change in output of the gas engine. Under certain circumstances, this can cause the correcting variables to overshoot.

A method for automatically controlling a stationary gas engine is disclosed by the nonprepublished German patent application with the official file number DE 10 2007 045 195.9, in which a gas throttle and a mixture throttle are simultaneously controlled as a function of the same actuating variable, in this case a set volume flow. The set volume flow is determined on the basis of a set torque, which is computed as a correcting variable by a speed controller from a set/actual deviation of the engine speeds. To improve the operating reliability, a torque limiter is provided, by which the set torque is limited as a function of a fault signal, a permissible mechanical maximum torque, and the actual engine speed. The fault signal is set, for example, in the event of a sensor failure. Due to the high dynamics during a load change, this automatic control system can lead to a mixture than is too rich. A mixture that is too rich causes excessive component stress, an elevated combustion temperature, and thus worse exhaust gas values.

SUMMARY OF THE INVENTION

The objective of the invention is to further develop the method described above with respect to the permissibility of the mixture.

This objective is achieved by a method in which a speed control deviation is computed from a set speed and an actual speed, the speed control deviation is used by a speed controller to determine a set torque as a correcting variable, and a torque limiter limits the set torque to an air ratio limit torque. In addition, in this method, a set volume flow is determined from the limited set torque to determine a mixture throttle angle and a gas throttle angle.

The air ratio limit torque is computed from a minimum lambda value and an actual mixture volume. The minimum lambda value is computed by an engine map as a function of the actual speed and an old value of the limited set torque. The old value of the limited set torque in turn corresponds to the limited set torque computed during the previous run through the program. The actual mixture volume is determined at least from a mixture temperature and an actual mixture pressure, which are measured in the receiver tube, and from the actual speed. Naturally, instead of the actual mixture volume being computed, alternatively, it can be measured directly. To improve the starting operation, the air ratio limit torque is set to a predeterminable starting torque.

To make it possible for the invention to be used in supplementation to the torque limitation known from DE 10 2007 045 195.9, the limited set torque is set by a minimum value selector to the smallest value of the set torque, of the air ratio limit torque, of a fault torque in the event of sensor failure, or of a maximum torque. The latter is determined at least from a permissible mechanical maximum torque and a limit-speed-dependent torque.

The invention offers the essential advantage that, while emission guidelines and safe operating limits are observed, even in dynamic states, impermissible mixture enrichment is prevented.

BRIEF DESCRIPTION OF THE DRAWINGS

The drawings illustrate a preferred embodiment of the invention.

DETAILED DESCRIPTION OF THE INVENTION

Figure 1:
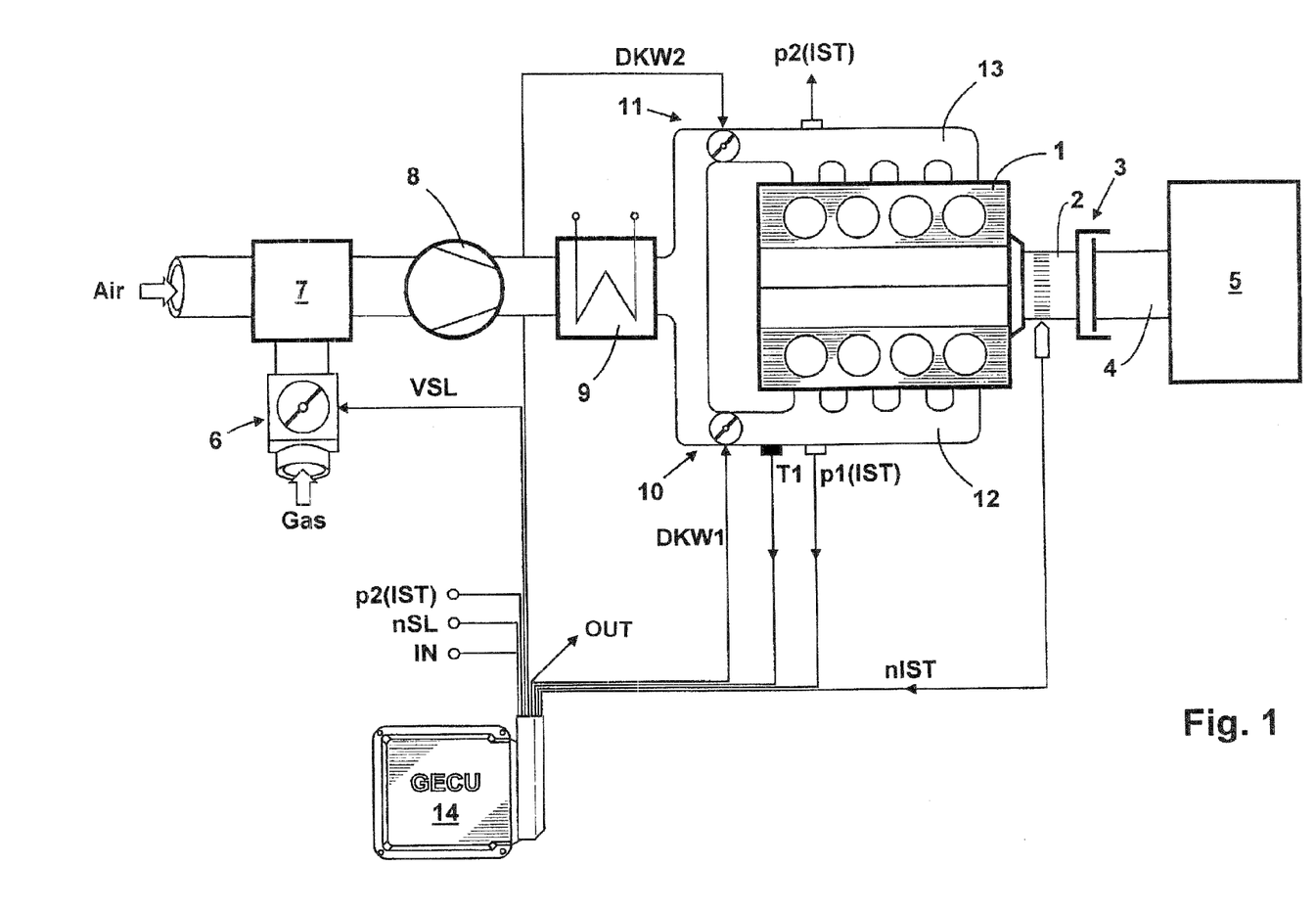
FIG. 1 is a total system diagram.

The operating mode of the gas engine 1 is determined by an electronic gas engine control unit 14 (GECU). The electronic engine control unit 14 contains the usual components of a microcomputer system, for example, a microprocessor, interface adapters, buffers, and memory components (EEPROM, RAM). Operating characteristics that are relevant to the operation of the gas engine 1 are applied in the memory components in the form of engine maps/characteristic curves. The electronic engine control unit 14 uses these to compute the output variables from the input variables. FIG. 1 shows the following input variables: a first actual mixture pressure p1(IST) and a mixture temperature T1, both of which are measured in the first receiver tube 12, a second actual mixture pressure p2(TST), which is measured in the second receiver tube 13, an actual engine speed nIST of the gas engine 1, a set speed nSL, which is preassigned by a system controller (not shown) of the generator 5, and an input variable IN. The other input signals, for example, the oil temperature, are combined as the input variable IN. FIG. 1 also shows the following output variables of the electronic engine control unit 14: the signal of a set volume flow VSL for controlling the gas throttle 6, the signal of a first mixture throttle angle DKW1 for controlling the first mixture throttle 10, the signal of a second mixture throttle angle DKW2 for controlling the second mixture throttle 11, and a signal OUT. The signal OUT is representative of the other signals for regulating and controlling the gas engine 1.

The system has the following general functionality: A gas volume flow supplied to the mixer 7 is adjusted by the position of the gas throttle 6. The position of the first mixture throttle 10 defines a first mixture volume and thus the first actual mixture pressure p1(IST) in the first receiver tube 12 upstream of the intake valves of the gas engine 1. The second mixture throttle 11 determines a second mixture volume and thus the second actual mixture pressure p2(IST) in the second receiver tube 13 upstream of the intake valves of the gas engine 1.

Figure 2:
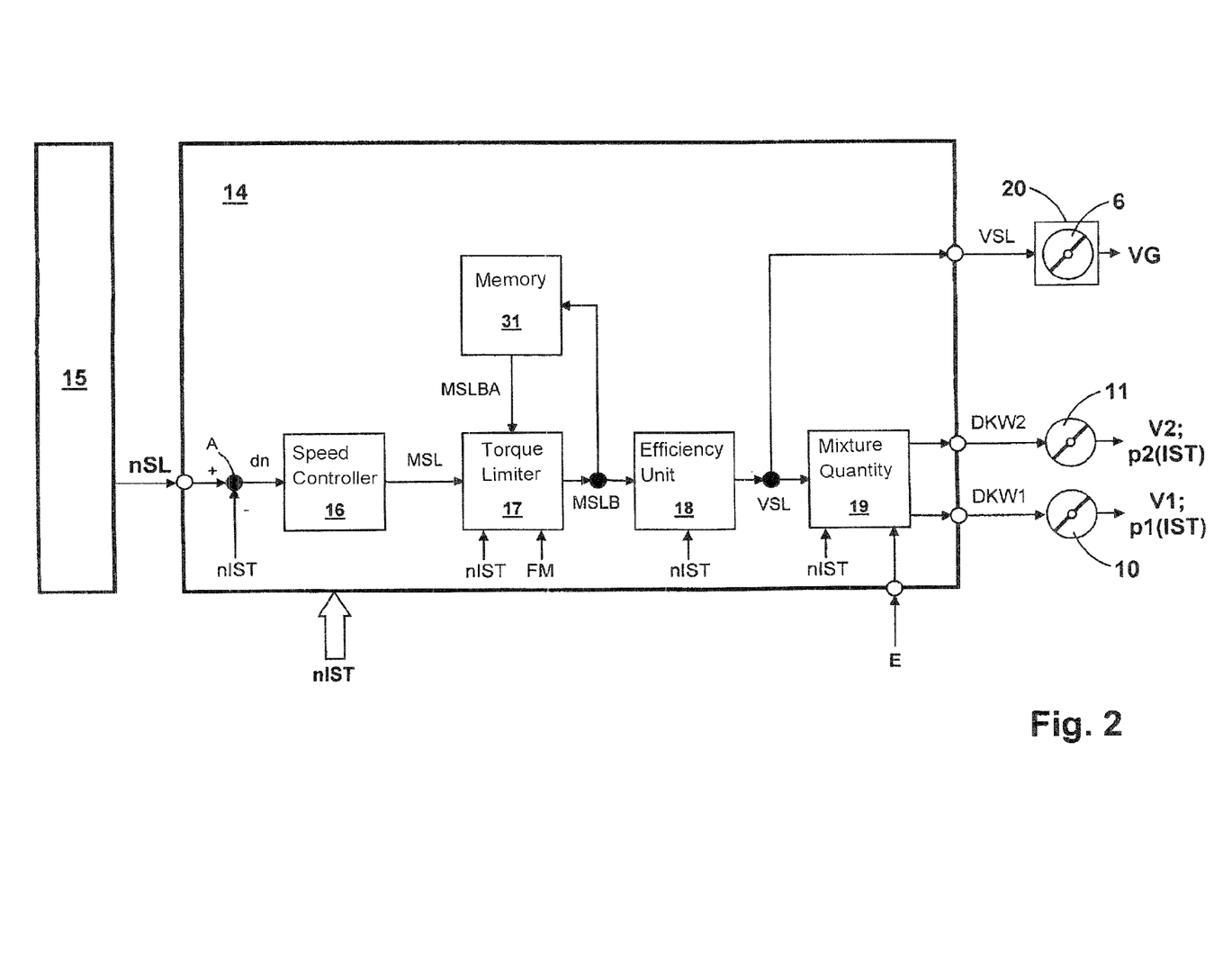
FIG. 2 is a functional block diagram for controlling the gas throttle and the mixture throttles.

FIG. 2 shows a functional block diagram for controlling the two mixture throttles 10 and 11 and the gas throttle 6. The system controller of the generator is identified by reference number 15. Reference number 14 identifies the electronic engine control unit in the form of a reduced functional block diagram, in which the depicted elements represent the program steps of an executable program. The input variables of the electronic engine control unit 14 in this representation are the set speed nSL, which is supplied by the system controller 15, the actual speed nIST, and an additional variable E. The additional variable E combines the following: a set lambda, a stroke volume of the cylinders of the gas engine, the volumetric efficiency in terms of a cylinder cutoff, and the fuel quality. The output variables are the first mixture throttle angle DKW1 for controlling the first mixture throttle 10, the second mixture throttle angle DKW2 for controlling the second mixture throttle 11, and the set volume flow VSL for controlling the gas throttle 6. The elements shown inside the electronic control unit 14 are: a speed controller 16 for determining a set torque MSL as a correcting variable, a torque limiter 17, a memory 31, an efficiency unit 18, and a mixture quantity unit 19 for converting the set volume flow VSL to the mixture throttle valve angle.

Figure 3:
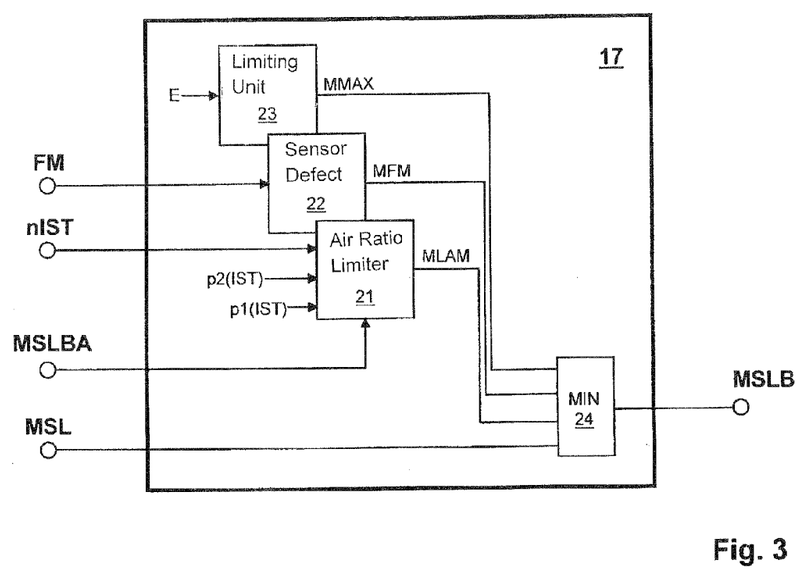
FIG. 3 is a functional block diagram of the torque limiter.

The set speed nSL, for example, 1,500 rpm, which corresponds to a frequency of 50 Hz, is preset by the system controller 15 as the desired output. At a point A, a speed control deviation dn is computed from the set speed nSL and the actual speed nIST. The speed controller 16 uses the speed control deviation dn to compute the set torque MSL as a correcting variable. In practice, the speed controller 16 is realized as a PIDT1 controller. The torque limiter 17 limits the set torque MSL. The torque limiter 17 is illustrated in FIG. 3 in the form of a functional block diagram and will be explained later in connection with FIG. 3. The output signal of the torque limiter 17 represents a limited set torque MSLB. If the value of the set torque MSL is in the permitted range, then the value of the limited set torque MSLB is the same as the value of the set torque MSL. The limited set torque MSLB is the input variable of the memory 31 and of the efficiency unit 18.

The current value of the limited set torque MSLB is held in the memory 31. During the next run through the program, a new value of the limited set torque MSLB is computed. However, before the old value presently held in the memory 31 is overwritten with the new value of the limited set torque MSLB, the old value is supplied to the torque limiter 17. If, for example, at time t, a limited set torque MSLB is present, then the old value corresponds to the limited set torque at time t−1. Hereinafter, this old value, i.e., the limited set torque at time t−1, will be called the old value of the limited set torque and will be referred to as MSLBA.

The set volume flow VSL is assigned by an efficiency unit 18 to the limited set torque MSLB as a function of the actual speed nIST. For this purpose, a suitable engine map is stored in the efficiency unit 18. The set volume flow VSL is the input variable of the mixture quantity unit 19 and at the same time is the input variable of the gas throttle 6. The mixture quantity unit 19 computes the first mixture throttle angle DKW1 and the second mixture throttle angle DKW2 from the set volume flow VSL as a function of the actual speed nIST and the input variable E. The mixture quantity unit 19 combines a first closed-loop control system for automatically controlling the first actual mixture pressure p1(IST) and a second closed-loop control system for automatically controlling the second actual mixture pressure p2(IST). The first mixture throttle 10 is controlled with the first mixture throttle angle DKW1. The first mixture throttle 10 sets a first mixture volume flow V1 and the first actual mixture pressure p1(IST). The second mixture throttle 11 is controlled with the second mixture throttle angle DKW2 and sets a second mixture volume flow V2 and the second actual mixture pressure p2(IST). The gas throttle 6 is also controlled with the set volume flow VSL. The gas throttle 6 has an integrated electronic processing unit 20, by which a suitable cross-sectional area and a suitable angle are assigned to the value of the set volume flow VSL. The gas throttle 6 sets a gas volume flow VG as the gas fraction of the gas/air mixture. The parallel control of the two mixture throttles 10 and 11 and the gas throttle 6 as a function of the same predetermined quantity, here, the set volume flow VSL, results in a short response time and a precise transient oscillation with improved adjustability of the total system. In addition, due to the parallel control, lambda tracking is not necessary.

FIG. 3 shows the torque limiter 17 as a functional block diagram. The input variables are the set torque MSL, the old value MLSBA of the limited set torque, the actual speed nIST, and a fault signal FM. The output variable corresponds to the limited set torque MSLB. The elements of the functional block diagram are an air ratio limiter 21 for computing an air ratio limit torque MLAM, a sensor defect unit 22 for determining a fault torque MFM, an additional limiting unit 23 for determining a maximum torque MMAX, and a minimum value selector 24. The air ratio limiter 21 uses the actual speed nIST, the old value MSLBA of the limited set torque, the first actual mixture pressure p1(IST), and the second actual mixture pressure p2(IST) to compute the air ratio limit torque MLAM. The air ratio limiter 21 is shown as a functional block diagram in FIG. 4 and will be explained later in connection with FIG. 4. If an error is detected in the signal acquisition, for example, in the event of a defective mixture temperature sensor, a predetermined fault torque MFM is set by the sensor defect unit 22. The fault signal FM is generated in the electronic engine control unit 14, which checks the input signals. The additional limiting unit 23 computes the maximum torque MMAX as a function of the input variable E. The maximum torque MMAX characterizes a permissible mechanical torque, a limit-speed-dependent torque for limiting the actual speed, and a system-specific maximum torque. The minimum value selector 24 sets as the limited set torque MSLB that torque which has the smallest value.

Figure 4:
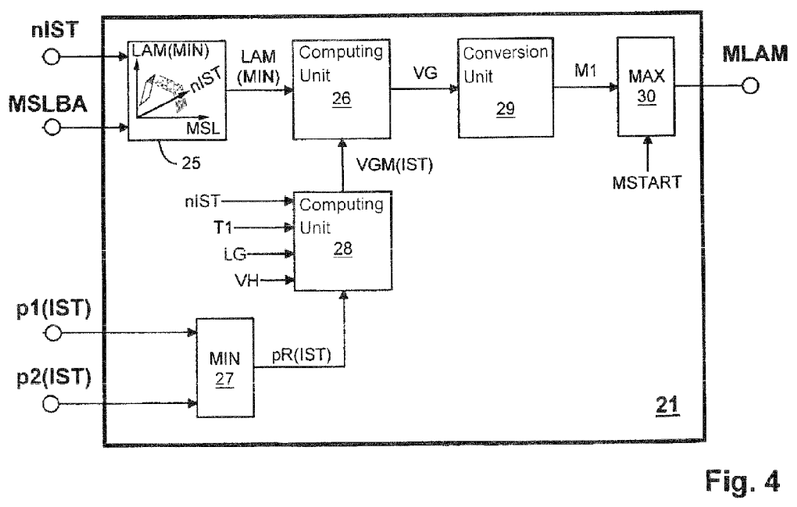
FIG. 4 is a functional block diagram of the air ratio limiter.

FIG. 4 shows the air ratio limiter 21 as a functional block diagram. The input variables are the actual speed nIST, the old value MSLBA of the limited set torque, the first actual mixture pressure p1(IST), and the second actual mixture pressure p2(IST). The output variable corresponds to the air ratio limit torque MLAM. The elements of the functional block diagram are an engine map 25 for determining a minimum lambda value LAM(MIN), a computing unit 26 for determining the gas volume flow VG, a minimum value selector 27, a computing unit 28 for determining an actual mixture volume VGM(IST), a conversion unit 29, and a maximum value selector 30.

The engine map 25 computes a minimum lambda value LAM(MIN) as a function of the actual speed nIST and of the old value MSLBA of the limited set torque, i.e., as a function of operating points. The minimum lambda value LAM(MIN) is the first input variable of the computing unit 26. The second input variable is the actual mixture volume VGM(IST), which is determined by the computing unit 28. The actual mixture volume VGM(IST) is computed by the following equation:

$$VGM(IST)=0.5[VH \cdot LG \cdot nIST \cdot (pR(IST)/pNORM) \cdot (TNORM/T1)],$$

where VH=the stroke volume, LG is the volumetric efficiency, nIST is the actual engine speed, pR(IST) is a representative actual mixture pressure, pNORM is standard air pressure (1013 mbars), TNORM is standard temperature (273.15 K), and T1 is the mixture temperature in the receiver tube. The representative actual mixture pressure pR(IST) can assume either the value of the first actual mixture pressure p1(IST) or the value of the second actual mixture pressure p2(IST) as determined by the minimum value selector 27. The minimum value selector 27 increases operating reliability, since the smaller actual mixture pressure substantially determines the air ratio limit torque MLAM. The computing unit 26 determines the gas volume flow VG on the basis of the minimum lambda value LAM(MIN) and the actual mixture volume VGM(IST). The gas volume flow VG is directly proportional to the actual mixture volume VGM(IST) and inversely proportional to the minimum lambda value LAM(MIN). The conversion unit 29 converts the gas volume flow VG to a torque M1. The maximum value selector 30 sets the limited set torque MSLB either to the value of the torque M1 or to a predeterminable starting torque MSTART.

Figure 5A:
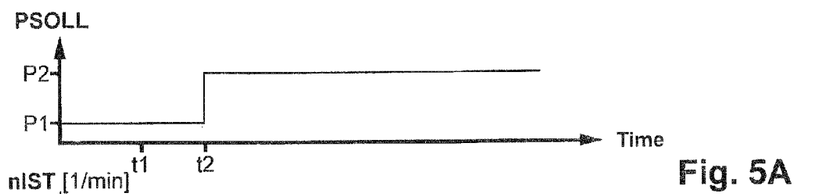
FIG. 5 shows a load change in the form of timing diagrams.
Figure 5B:
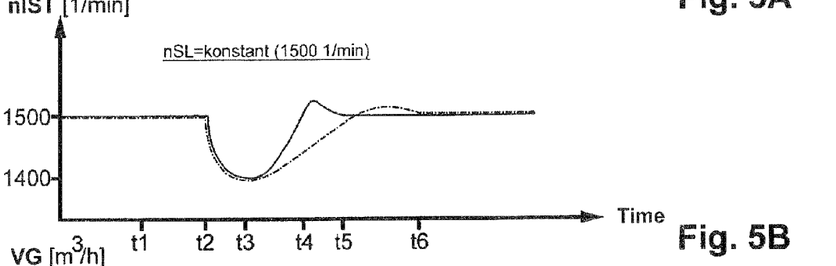
Figures 5C, 5D, 5E:
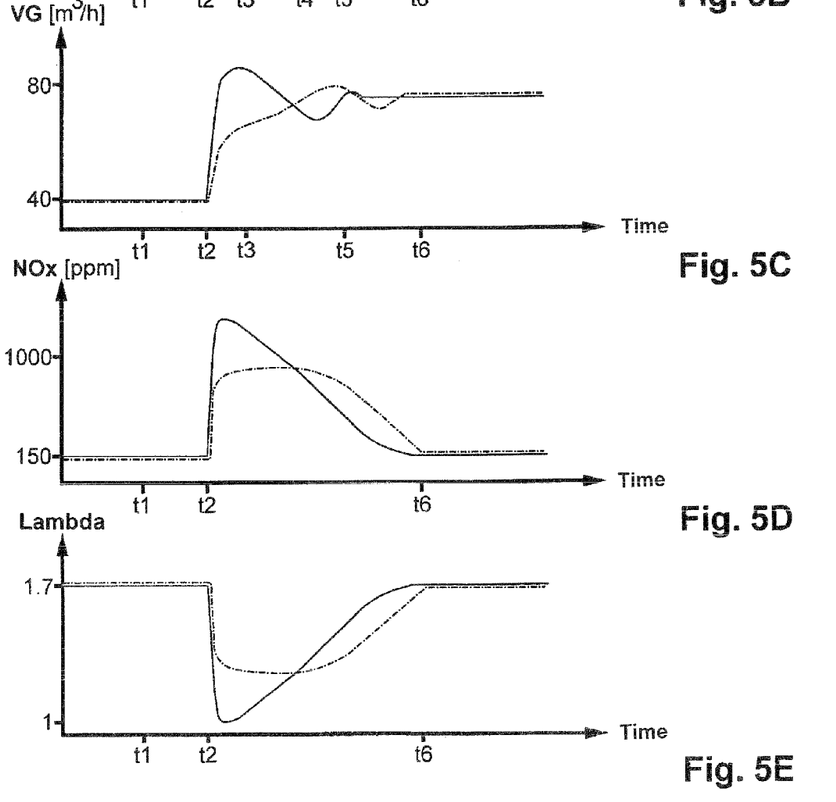

FIG. 5 shows a load change in the form of timing diagrams. FIG. 5 consists of five diagrams 5A to 5E. These diagrams show the following as a function of time: a set power PSOLL (FIG. 5A), the behavior of the actual speed nIST in rpm (FIG. 5B), the gas volume flow VG in cubic meters/hour (FIG. 5C), the course of the NO in ppm (FIG. 5D), and the measured lambda (FIG. 5E), which is not an input variable of the method and was graphed only to illustrate the conditions. The solid lines in the graphs are curves obtained in accordance with the prior art (DE 10 2007 045 195.9). The dot-dash lines are curves obtained in accordance with the invention. In the remainder of the specification, we start from a constant set speed nSL of 1,500 rpm.

At time t1 the system is in a steady state, i.e., the gas engine is operated at a constant lambda value of 1.7, and the actual speed nIST is the same as the set speed nSL of 1,500 rpm with a constant gas volume flow VG of about 40 cubic meters/hour and a constant $NO_x$ value of about 150 ppm. At time t2 a load is applied with a higher power demand. In FIG. 5A, the higher power demand is characterized by a power jump from the value P1 to the value P2.

In the pattern according to the prior art (solid line), the actual speed nIST drops sharply starting at t2 and reaches its minimum value, for example, 1,400 rpm, at time t3. Due to the now negative control deviation, the speed controller computes a higher set torque, from which a higher set volume flow is then determined. Due to the parallel control of the mixture throttles and the gas throttle, a higher mixture volume flow and a higher gas volume flow VG are established. In FIG. 5C, therefore, the gas volume flow VG increases to a value of about 90 cubic meters/hour. Due to the low actual speed nIST, however, the gas engine is unable to deliver a corresponding mixture volume flow, i.e., the air fraction of the gas-air mixture remains more or less unchanged, while, on the other hand, the gas fraction increases. This causes a decreasing lambda (FIG. 5E), i.e., an increasingly rich mixture, and brings about a sharply increasing $NO_x$ fraction in the exhaust gas (FIG. 5D). With a now decreasing control deviation, a likewise decreasing gas volume flow VG develops. Since the gas engine delivers a higher mixture volume, the lambda value increases again. At time t4 the actual speed nIST swings above the set speed nSL and then gradually returns to the set speed nSL of 1,500 rpm by time t5.

In the pattern according to the invention (dot-dash line), starting at time t2, likewise with increasingly negative control deviation, a higher set torque is computed, but this higher set torque is limited to the air ratio limit torque. This results in a lower set volume flow, a lower gas volume flow VG, and a lower mixture volume compared to the pattern according to the prior art. As FIG. 5C, shows, the dot-dash curve of the gas volume flow VG in the time interval t2/t3 remains significantly below the curve traced by the solid line. The lambda value (FIG. 5E) falls correspondingly less, and the NO value increases correspondingly less sharply. At time t5 the actual speed nIST swings above the set speed nSL and then stabilizes starting at time t6 to the level of the set speed nSL. The lambda value and the NO value likewise return to their initial values at time t6.

REFERENCE NUMBERS 1 gas engine
2 shaft
3 coupling
4 shaft
5 generator
6 gas throttle
7 mixer
8 compressor
9 cooler
10 first mixture throttle
11 second mixture throttle
12 first receiver tube
13 second receiver tube
14 electronic engine control unit (GECU)
15 system controller
16 speed controller
17 torque limiter
18 efficiency unit
19 mixture quantity unit
20 electronic processing unit
21 air ratio limiter
22 sensor defect unit
23 additional limiting unit
24 minimum value selector
25 engine map
26 computing unit
27 minimum value selector
28 computing unit
29 conversion unit
30 maximum value selector
31 memory

The invention claimed is:

1. A method for automatically controlling a stationary gas engine, comprising the steps of: computing a speed control deviation (dn) from a set speed (nSL) and an actual speed (nIST); using the speed control deviation (dn) in a speed controller to determine a set torque (MSL) as a correcting variable; limiting the set torque (MSL) by a torque limiter to an air ratio limit torque (MLAM); and determining a set volume flow (VSL) from the limited set torque (MSLB) in order to determine a mixture throttle angle (DKW1, DKW2) and a gas throttle angle.

2. The method in accordance with claim 1, including computing the air ratio limit torque (MLAM) from a minimum lambda value (LAM(MIN)) and an actual mixture volume (VGM(IST)).

3. The method in accordance with claim 2, including computing the minimum lambda value (LAM(MIN)) by an engine map as a function of an old value (MSLBA) of the limited set torque (MSLB) and the actual speed (nIST), where the old value (MSLBA) is equal to the limited set torque (MSLB) computed during a previous run through the program.

4. The method in accordance with claim 2, including computing the actual mixture volume (VGM(IST)) at least as a function of a mixture temperature (T1) in a receiver tube of the engine, an actual mixture pressure (p1(IST), p2(IST)), and the actual speed (nIST).

5. The method in accordance with claim 4, including determining the actual mixture pressure as a representative actual mixture pressure (pR(IST)) from a first actual mixture pressure (p1(IST)) or a second actual mixture pressure (p2(IST)).

6. A method in accordance with claim 2, including measuring the actual mixture volume (VGM(IST)) in a receiver tube of the engine.

7. The method in accordance with claim 1, including setting the air ratio limit torque (MLAM) to a starting torque during a starting operation.

8. The method in accordance with claim 1, including setting the limited set torque (MSLB) by a minimum value selector to a smallest value of the set torque (MSL), a fault torque (MFM), the air ratio limit torque (MLAM), or a maximum torque (MMAX), where the maximum torque (MMAX) is determined at least from a permissible mechanical maximum torque and a limit-speed-dependent torque.

* * * * *

UNITED STATES PATENT AND TRADEMARK OFFICE
CERTIFICATE OF CORRECTION

PATENT NO. : 8,683,983 B2
APPLICATION NO. : 12/744122
DATED : April 1, 2014
INVENTOR(S) : Baldauf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this
Twenty-ninth Day of September, 2015

Michelle K. Lee
*Director of the United States Patent and Trademark Office*